United States Patent [19]

Davis

[11] 3,923,775
[45] Dec. 2, 1975

[54] 8,8-DIOXO-6,6-AZOPURINE AND METHOD FOR PREPARING THE SAME

[75] Inventor: Joseph R. Davis, Chicago, Ill.

[73] Assignee: Research Corporation, New York, N.Y.

[22] Filed: Nov. 26, 1973

[21] Appl. No.: 418,877

Related U.S. Application Data

[63] Continuation-in-part of Ser. No. 333,043, Feb. 16, 1973, abandoned.

[52] U.S. Cl. ............... 260/154; 252/408; 424/226
[51] Int. Cl.² ................................ C07C 107/00
[58] Field of Search .................... 260/154

[56] References Cited
UNITED STATES PATENTS

| | | | |
|---|---|---|---|
| 2,832,764 | 4/1958 | Huenig | 260/158 |
| 3,654,258 | 4/1972 | McKay | 260/154 |

FOREIGN PATENTS OR APPLICATIONS

| | | | |
|---|---|---|---|
| 1,131,686 | 6/1962 | Germany | 260/154 |

OTHER PUBLICATIONS

*Chemical Abstracts*, Vol. 72, 1970, 90409d, p. 392, (Giner–Sorolla, "Reactions of 6-hydrazino & 6-hydroxylamino Purines and Related Derivatives").

Zollinger, *Azo & Diazo Chemistry*, Interscience Publishers, Inc., New York, 1961, pp. 215–217.

Kolthoff, et al., *Textbook of Quantitative Inorganic Analysis*, The MacMillan Company, New York, 1952, pp. 574–575.

*The Merck Index*, 8th Ed., Merck & Co., Inc., New Jersey, 1968, pp. 545 & 856.

Primary Examiner—Charles F. Warren
Attorney, Agent, or Firm—Hume, Clement, Brinks, William, Olds & Cook, Ltd.

[57] ABSTRACT

A novel compound, 8,8'-dioxo-6,6'-azopurine having the following structural formula:

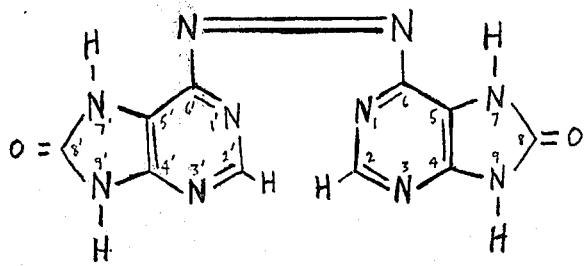

3 Claims, No Drawings

8,8-DIOXO-6,6-AZOPURINE AND METHOD FOR PREPARING THE SAME

This application is a continuation-in-part of my copending application Ser. No. 333,043, filed Feb. 16, 1973, now abandoned.

The present invention relates to a new compound, 8,8'-dioxo-6,6'-azopurine, having the following structure:

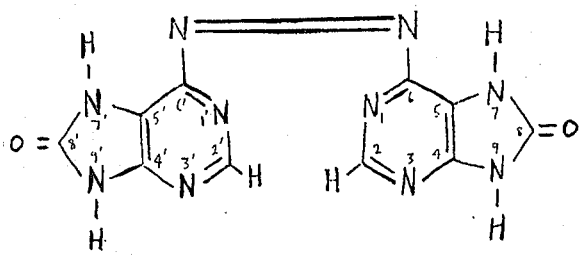

In applicant's parent application, Ser. no. 333,043, a novel compound, along with the manner of making and using it, was described as 2,2',8-trihydroxy-6,6'-azopurine (THAP). It has now been found that this compound was structurally mischaracterized as a result of failure to detect the presence of one molecule of water of hydration. It was originally postulated that this water of hydration formed part of the molecule itself, so that two extra hydrogen atoms and one extra oxygen atom were ascribed to the structure. However, further careful analyses have now shown that the above structure is the correct one. It should be understood, however, that the compound of the present invention normally exists, in the presence of air, in the hydrated form with one water of hydration. Removal of this water requires careful heating in a dry atmosphere, and the water will rapidly be picked up by the dehydrated compound in the presence of air.

In addition, it has been found that DOAP is useful in the inhibition of xanthine oxidase, and that this inhibition is not competive with xanthine. Because of this activity, the compounds of the present invention have utility in the treatment of hyperuricemia and its associated diseases such as gout.

Finally, DOAP also shows utility in the treatment of cancer in animals as a result of an experiment showing a toxic effect on mouse lymphoma, while no toxic effect on normal human lymphocytes was exhibited.

The present invention also relates to a method for preparing DOAP in which adenine having a concentration of at least 1 mg/ml is reacted with potassium permanganate in the presence of potassium bromide in aqueous solution under acidic conditions. The reaction product is further reacted with hydrogen peroxide in an amount sufficient to remove the purple color of the potassium permanganate. The product is an orange precipitate.

In carrying out the foregoing reaction, it is preferred that the acid concentration be in the range of 0.1 to 5.0 N. The potassium permanganate should have a concentration of 1 to 50 micromoles/ml reaction mixture, and the potassium bromide concentration should preferably be 1 to 50 micromoles/ml reaction mixture.

The mechanism by which the compound is prepared is not presently understood. However, the structure of the compound has been identified through elemental analysis before and after drying, nuclear magnetic resonance studies, and reductive cleavage to form 8-hydroxyadenine.

It is also possible that the compound of the present invention undergoes keto-enol tautomerism in solution, and both tautomers have therefore been shown above.

Although both of the above tautomers are theoretical possibilities, the compound of the present invention has been consistently represented herein as the oxo tautomer. While there is little evidence that oxopurines exist as the hydroxy tautomers, the hydroxy tautomer may be an intermediate in some reactions. The hydroxy tau-

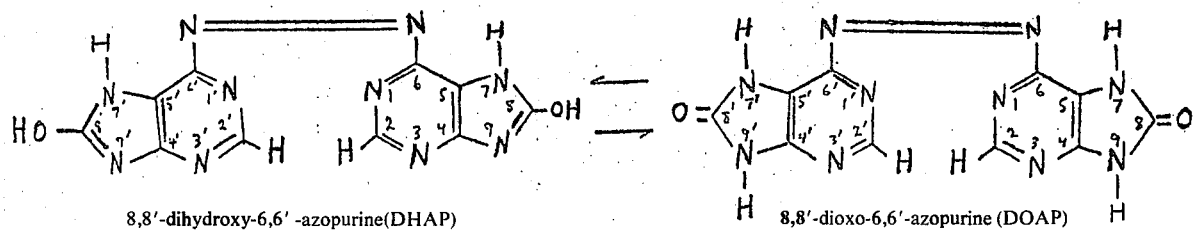

8,8'-dihydroxy-6,6'-azopurine(DHAP)      8,8'-dioxo-6,6'-azopurine (DOAP)

8,8'-dioxo-6,6'-azopurine, referred to herein as dioxoazopurine, or simply DOAP, has been found to have a number of unique properties and uses. The composition can be utilized as a pH indicator, as a dye, and in the laboratory to inhibit or reverse the effect of the paralytic agent, curare. Because the compound has been demonstrated to have a very powerful anticurare effect, the compounds can also be employed in the therapeutic management of myasthenia gravis, a disease of neuromuscular transmission tomer has therefore been named as 8,8'-dihydroxy-6,6'-azopurine (DHAP), which could also normally be expected to exist in the monohydrate form. It is theorized that other tautomeric forms exist in various solvents. It should be kept in mind that when applicant refers to the dioxoazopurine of the present invention, he also refers to the tautomers that are formed in various solutions.

As previously mentioned, the compound of the present invention can be utilized as a pH indicator, and is particularly useful as an pH indicator, and is particularly useful as an pH indicator in organic solvents, as the compound is soluble in several common organic solvents including ethanol, dimethyl sulfoxide, and dimethyl formamide. The color change is very sharp in the area of pH 10.5, and again in the vicinity of pH 11.5, as shown in the following table.

| pH | Color |
|---|---|
| Above 11.5 | Red |
| 10.6 – 11.4 | Orange |
| 6.2 – 10.5 | Yellow |
| Below 6.2 | Colorless |

Because the dioxazopurine of the present invention is characterized by brilliant color, it is also usable as a dye, producing a yellow or lavender color. As a dye, the compound may be fixed by conventional mordants, such as tartaric acid and Glauber's Salt. A yellow color is produced at slightly alkaline pH levels, and a brilliant lavender is produced by treating the dyed fabric with a concentrated solution of sodium hydroxide.

The compound of the present invention also has utility in the laboratory in connection with experiments involving the use of curare as a neuromuscular junction block.

As is well known in the art, curare is frequently used in laboratory experiments involving the stimulation of muscle with electrical energy where it is desired to bypass the nerve. If it is then desired after this portion of the experiment to stimulate the nerve in order to perform another experiment or to continue another phase of the same experiment, it is desirable to inactivate the curare with a composition having an anticurare effect. As previously mentioned, the compound of the present invention has an anticurare effect, and therefore can be so utilized in the laboratory. Very low dosage levels are required, as indicated in the examples which follow.

In addition, the compound of the present invention may be administered to humans in order to counteract the symptoms of the disease myasthenia gravis. It is well known by those skilled in the art that anticurare agents are effective in combating this disease. In the past, all anticurare agents have been found to also be anticholinesterse agents. It is believed that such agents overcome the curare effect by inhibiting the activity of acetylcholinesterase, thus, in effect overpowering the curare with an excess of acetylcholine. However, the compositions of the present invention apparently operate through a different mechanism, and are not anticholinesterase agents, as demonstrated by the following experimental data.

As previously stated, the compound of the present invention is a xanthine oxidase inhibitor, and may be administered to humans for the treatment of hyperuricemia and its associated disease, gout. Because the compound has an activity comparable to that of allopurinol, a conventional drug used in the treatment of gout, it is expected that oral dosages will be comparable, i.e., 10 mg/kg body weight per day.

The following examples are intended to illustrate the present invention, and should not be construed as limitative, the scope of the invention being determined by the appended claims.

EXAMPLE I

In order to prepare the dioxoazopurine of the present invention, 15 grams of adenine were dissolved in 2.5 liters of 1 N. sulfuric acid in a 5 liter vessel. 1.8 grams of potassium bromide were dissolved in 120 ml. of water, and this solution was added to the adenine solution and stirred for 1 hour with a mechanical stirrer. 800 ml. of a 1 N. solution of potassium permanganate were then added, and the solution was again stirred for one hour. Finally, 50 ml. of 30% hydrogen peroxide were added and stirred for 1 hour, after which the solution was cooled to 4° C., and was allowed to stand at this temperature without stirring for sixteen hours.

At the end of this period, the purple color of the potassium permanganate had disappeared, and the vessel contained a yellow supernate and an orange precipitate. The bulk of the supernate was decanted, and the remainder was centrifuged at 600 S's. The precipitate was then successively washed with 8 liters of 4 normal sulfuric acid, 4 liters of water, and 2 liters of acetone. The precipitate was then dried in an oven at atmospheric pressure for 16 hours at 75° C, and then for 1 hour at 100° C. The total weight of the precipitate was 0.78 gram, indicating about a 5% yield of dioxoazopurine.

EXAMPLE II

To demonstrate the use of DOAP as a pH indicator, a stock solution was prepared by dissolving 5 mg. DOAP in 3 ml. of 0.05 N. sodium hydroxide. This solution was then diluted to 10 ml. with water, so that the stock solution had a concentration of 0.5 mg. DOAP per ml. of 0.015 N. NaOH.

75 ml. of 1 N. sodium hydroxide was placed in a beaker equipped with a magnetic stirrer. 1.5 ml. of the DOAP stock solution was added, and the solution immediately became a brilliant red color. The electrodes of a pH meter were immersed in the liquid, and a titration was performed with hydrochloric acid. The following color changes were noted:

| pH | Color |
|---|---|
| Above 11.5 | Red |
| 11.4 | Orange |
| 10.5 | Yellow |
| 6.1 | Colorless |

At pH 6.1, the liquid became slightly cloudy, indicating that a finely divided precipitate had been formed.

EXAMPLE III

To demonstrate the use of DOAP as a dye, a solution of DOAP was prepared having a concentration of 1.6 mg/ml in 0.05 N. sodium hydroxide. A small piece of 100% cotton was placed in a beaker containing 50 ml. of tap water at 90° C., and was soaked for 5 minutes at this temperature. Three ml. of the DOAP solution was then added, and the solution was maintained at 90° C. for 10 minutes. At this time, the cloth and solution were purple in color.

In another beaker, a mordant was prepared by dissolving four grams of tartaric acid and four grams of Glauber's Salt (sodium sulfate) in 50 ml. of water. This solution was added to the beaker containing the cloth at 90° C. Immediately upon the addition of the mordant, the cloth became a yellow-orange color. The liquid was maintained at 90° C. for 20 minutes, and then was cooled to room temperature.

After the dye-mordant solution had cooled, the cloth was removed and dried overnight at room temperature in diffuse room light. The dried cloth had a golden yellow color which was not removed by a hot or cold water rinse or by washing with soap and water.

The cloth was rinsed in a 10 N. solution of sodium hydroxide, whereupon the color became a brilliant lavender. This color persisted through hot and cold rinses.

EXAMPLE IV

To demonstrate the use of DOAP to reverse a curare block, a cat was anesthetized with chloralose and arranged for recording indirectly elicited twitches of the tibialis anterior muscle. Curare was administered systemically to cause a 75–85% block of neuromuscular transmission. A close retrograde arterial injection of 25 micrograms DOAP dissolved in 0.5 ml. of 0.0025 N. NaOH was made. Even in this extremely small amount, a 10.5% reversal of the curare block was observed. A control experiment was performed with 0.5 ml. of 0.0025 N. NaOH, and it was determined that the curare reversal did not result from the dilute NaOH employed as the solvent for DOAP.

EXAMPLE V

Example IV was repeated, except that 333 micrograms of DOAP dissolved in 0.5 ml. 0.0025 normal NaOH was employed. A 74.2% reversal of the curare block was obtained, indicating an extremely high degree of potency of DOAP as an anticurare agent.

EXAMPLE VI

In order to evaluate the effect of DOAP in the absence of curare, Example IV was repeated without the curare block, and utilizing an injection of 250 micrograms of DOAP in 0.5 ml. of 0.0025 N. sodium hydroxide. This experiment demonstrated that DOAP did not augment the twitch of the tibialis anterior muscle. This result was totally unexpected, as it is believed that all known anticurare agents have such an augmenting effect.

EXAMPLE VII

The previous example was repeated, except that in the absence of indirect electrical stimulation the muscle twitch was initiated with a close retrograde arterial injection of 25 micrograms of acetyl choline. After the twitch was initiated, 250 micrograms of DOAp in 0.5 ml. 0.0025 N. NaOH was injected and the injection of acetyl choline repeated. No significant change in the acetyl choline-elicited muscle twitch was observed, showing that DOAP is not an anticholinesterase agent, as are most of the existing anticurare agents.

EXAMPLE VIII

The phrenic nerve-diaphragm of a rat was prepared, and immersed in 50 ml. of Kreb's bicarbonate buffer, and connected to a recorder. The addition of curare produced a decrease in the electrically induced twitching of the diaphragm from 31.0 millimeters to 10.0 millimeters. It was found that the injection of 5 ml. of 0.005 normal NaOH into the solution had no effect on this decrease.

In a second experiment, 5 milliliters of a 692 micrograms per ml. solution of DOAP in 0.005 normal NaOH was added after the twitching began to decrease, and a 66.66% reversal of the curare block was noted at three minutes after the addition of the DOAP. Furthermore, as demonstrated by the addition of the NaOH solution, this reversal did not result from the NaOH.

EXAMPLE IX

The preceding example was repeated except that the DOAP was added before the curare. The results showed definite protection against the effects of the curare as compared with a similar experiment in which no DOAp was employed. This result indicates that DOAP is a direct competitive antagonist of curare.

As the preceding examples indicate, the dioxoazopurine of the present invention has extremely valuable properties, and can be employed for the treatment of myasthenia gravis. Because the potency of the compound appears to be at least as high as that of known anticurare agents used in the treatment of myasthenia gravis, dosage levels should be comparable. That is, myasthenia gravis can be treated by the oral administration of 50 to 100 milligrams to the patient at intervals of two or three times per day.

EXAMPLE X

In order to demonstrate the effect of DOAP as a xanthine oxidase inhibitor, a spectrophotometric method for determining xanthine oxidase activity was employed which measured uric acid formation at 290 nm. Assay conditions were adjusted so that the rate of increase in absorbance using a Beckman DB-G recording spectrophotometer was linearly proportional to the amount of xanthine oxidase (obtained from Sigma Chemical Co., St. Louis, Mo.) present. Each experimental cuvette contained 1.75 ml of 0.05 M. potassium phosphate buffer, pH 7.5, 1.0 ml of a $1.6 \times 10^{-5}$ M. solution of xanthine, 0.01 ml of various concentrations of DOAP in 0.005 N. NaOH and 0.25 ml of a 0.5 mg/ml solution of xanthine oxidase. After a 2-minute equilibration period at 25° C, the enzyme was added last, the cuvette contents rapidly mixed, and the optical density at 290 nm recorded with time against a reference cell from which the xanthine substrate had been omitted. The change in optical density at 290 nm per minute was obtained from the linear portion of the curve of increasing extinction in the presence and absence of DOAP. A 50% inhibition of xanthine oxidase activity was found to occur at a final concentration of $2.0 \times 10^{-8}$ M. DOAP in the reaction mixture. Results of both a Lineweaver and Burk plot as well as a Dixon plot revealed an average inhibitor constant (Ki) of $2.5 \times 10^{-8}$ M. for DOAP while indicating that the nature of the inhibition of xanthine oxidase by DOAP was noncompetitive.

EXAMPLE XI

In order to demonstrate the lymphoma inhibiting effect of DOAP, a cell suspension of mouse lymphoma 6C3HED ascitic tumor was incubated in tissue culture medium to which a solution of DOAP in 0.005 N. NaOH was added to give a final concentration of 50 micrograms DOAP per ml. The cell suspension was incubated for 2 days at 37° C., and the number of living cells was counted with phase microscopy before and after incubation.

It was found that the DOAP had a definite toxic effect on the cells, which resulted in the death of most of the cells after the 2 day incubation period. In another experiment, it was found that the same concentration of DOAP had no effect on normal human lymphocytes incubated for 2 days under similar conditions. Thus, DOAP was shown to have a definite toxic effect on cancer cells without affecting normal cells, and shows utility as an anticancer agent.

Obviously, many modifications and variations of the invention as hereinbefore set forth will occur to those skilled in the art, and it is intended to cover in the appended claims all such modifications and variations as fall within the true spirit and scope of the invention.

I claim:

1. 8,8'-dioxo-6,6'-azopurine.

2. A method for preparing 8,8'-dioxo-6,6'-azopurine comprising: reacting adenine having a concentration of at least 1 mg/ml in aqueous solution under acidic conditions with potassium permanganate in the presence of potassium bromide; adding hydrogen peroxide in an amount sufficient to remove the purple color of the potassium permanganate and to produce an orange precipitate; and recovering said precipitate.

3. The method as defined in claim 2 wherein said aqueous solution contains an acid having a concentration of 0.1 to 5.0 Normal, said potassium permanganate has a concentration of about 1 to 50 micromoles/ml reaction mixture, and said potassium bromide has a concentration of about 1 to 50 micromoles/ml reaction mixture.

* * * * *

UNITED STATES PATENT OFFICE
CERTIFICATE OF CORRECTION

Patent No. 3,923,775      Dated December 2, 1975

Inventor(s) Joseph R. Davis

It is certified that error appears in the above-identified patent and that said Letters Patent are hereby corrected as shown below:

In the Specification

Column 4, line 19, "S's" should be --G's--

Column 5, line 50, "DOAp" should be --DOAP--

Column 6, line 11, "DOAp" should be --DOAP--

Signed and Sealed this second Day of March 1976

[SEAL]

Attest:

RUTH C. MASON
Attesting Officer

C. MARSHALL DANN
Commissioner of Patents and Trademarks